(12) United States Patent
Wiedenhoefer

(10) Patent No.: US 12,013,187 B2
(45) Date of Patent: Jun. 18, 2024

(54) METHOD OF CREATING A COMPONENT VIA TRANSFORMATION OF REPRESENTATIVE VOLUME ELEMENTS

(71) Applicant: Raytheon Technologies Corporation, Waltham, MA (US)

(72) Inventor: James F. Wiedenhoefer, Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 633 days.

(21) Appl. No.: 17/171,321

(22) Filed: Feb. 9, 2021

(65) Prior Publication Data

US 2021/0164733 A1 Jun. 3, 2021

Related U.S. Application Data

(62) Division of application No. 16/353,206, filed on Mar. 14, 2019, now Pat. No. 10,948,237.

(51) Int. Cl.
| | |
|---|---|
| *F28D 1/00* | (2006.01) |
| *B33Y 80/00* | (2015.01) |
| *F28D 7/16* | (2006.01) |
| *F28F 13/06* | (2006.01) |
| *G05B 19/4097* | (2006.01) |
| *G06F 30/17* | (2020.01) |

(52) U.S. Cl.
CPC .......... *F28D 7/1638* (2013.01); *B33Y 80/00* (2014.12); *F28F 13/06* (2013.01); *G05B 19/4097* (2013.01); *G06F 30/17* (2020.01); *F28F 2250/10* (2013.01)

(58) Field of Classification Search
CPC ..... F28D 7/1638; F28F 13/06; F28F 2250/10; B33Y 80/10; G05B 19/4097; G06F 30/17

USPC ........................................................ 165/148
See application file for complete search history.

(56) References Cited

U.S. PATENT DOCUMENTS

| | | | |
|---|---|---|---|
| 7,866,372 B2 | 1/2011 | Slaughter | |
| 7,866,377 B2 | 1/2011 | Slaughter | |
| (Continued) | | | |

FOREIGN PATENT DOCUMENTS

| | | | |
|---|---|---|---|
| CN | 201310653 Y | * | 9/2009 |
| CN | 202793140 U | | 3/2013 |
| JP | 6775675 B2 | | 10/2020 |

OTHER PUBLICATIONS

Extended European Search Report for EP Application No. 20213561.2, dated Apr. 30, 2021, pp. 10.
Chen et al. "Liquid Flow Distribution in Compact Parallel Flow Heat Exchangers" Published in 2011 IEEE 3rd International Conference on Communication Software and Networks, Electronic ISBN:978-1-61284-486-2 Print ISBN:978-1-61284-485-5 (Year: 2011).
Communication Pursuant to Article 94(3) EPC for EP Application No. 20161886.5, dated Apr. 26, 2022, pp. 11.

(Continued)

*Primary Examiner* — Davis D Hwu
(74) *Attorney, Agent, or Firm* — Kinney & Lange, P. A.

(57) ABSTRACT

A method of forming a component includes defining a component volume discretized by a target mesh formed by a plurality of volume elements, each volume element defined, at least in part, by a shape function. The method further includes defining a parting surface within a representative volume element and discretizing the parting surface using a surface mesh that includes a plurality of surface elements and a plurality of surface nodes. The method further includes mapping the surface mesh into each volume element of the target mesh according to the quartic, or higher order, shape functions of the target mesh and forming a component based on the component surface structure produced by the mapped surface mesh.

15 Claims, 11 Drawing Sheets

(56) References Cited

U.S. PATENT DOCUMENTS

| | | |
|---|---|---|
| 8,240,365 B2 | 8/2012 | Obana et al. |
| 9,440,216 B2 | 9/2016 | Ryan |
| 10,107,555 B1 | 10/2018 | Miller |
| 10,174,621 B2 | 1/2019 | Burd |
| 2006/0173660 A1 | 8/2006 | Itoh et al. |
| 2008/0149299 A1 | 6/2008 | Slaughter |
| 2009/0112529 A1 | 4/2009 | Kataoka et al. |
| 2009/0171636 A1 | 7/2009 | Shimizu |
| 2012/0059865 A1 | 3/2012 | Shao et al. |
| 2012/0239359 A1 | 9/2012 | Furuya et al. |
| 2013/0299148 A1 | 11/2013 | Hernon et al. |
| 2014/0014493 A1 | 1/2014 | Ryan |
| 2016/0069622 A1 | 3/2016 | Alexiou et al. |
| 2016/0202003 A1 | 7/2016 | Gerstler et al. |
| 2016/0363389 A1 | 12/2016 | Hemker et al. |
| 2017/0367218 A1 | 12/2017 | Gerstler et al. |
| 2018/0187984 A1 | 7/2018 | Manzo |
| 2018/0297843 A1 | 10/2018 | Lo et al. |
| 2018/0356158 A1 | 12/2018 | Kusuda et al. |
| 2019/0011187 A1 | 1/2019 | Bucknell |
| 2019/0024987 A1 | 1/2019 | Moore et al. |
| 2019/0087520 A1 | 3/2019 | Nitsche et al. |
| 2019/0368811 A1 | 12/2019 | Zhao et al. |
| 2020/0257833 A1 | 8/2020 | Marini |

OTHER PUBLICATIONS

G R Liu et al., "The Finite Element Method—A practical course (Excerpt from chapters 7 and 9)" In: The Finite Element Method—A practical course (Excerpt from chapters 7 and 9), Jan. 1, 2003 (Jan. 1, 2003), Butterworth Heinemann, Oxford, MN, USA, XP055717578, ISBN: 978-0-7506-5866—p. 148-151, 156-157, 143-144, 199-200, 209-223 p. 222, last paragraph—p. 223 paragraph 2 *figures 9.14, 9.18* *the whole document*.

Extended European Search Report for EP Application No. 20161886.5, dated Aug. 3, 2020, pp. 16.

Oraib Al-Ketan et al., "Multifunctional Mechanical Metamaterials Based on Triply Periodic Minimal Surface Lattices," Advance Engineering Materials, vol. 21, No. 10, Aug. 20, 2019 (Aug. 20, 2019), p. 1900524, XP055759109, DE ISSN: 1438-1656, DOI: 10.1002/adem.201900524 *p. 6-p. 11 *.

Joshuah K Stolaroff: "LLNL-Pres-XXXXX FEW0225: High-efficiency, integrated reactors for sorbents, solvents, and membranes using additive manufacturing," Aug. 13, 2018 (Aug. 13, 2018), XP055749802, Retrieved from Internet: URL:https://netl.doe.gov/sites/default/files/netl-file/J-Stolaroff-LLNL-Reactor-Additive-Manufacturing.pdf *p. 4*.

* cited by examiner

METHOD OF CREATING A COMPONENT VIA TRANSFORMATION OF REPRESENTATIVE VOLUME ELEMENTS

This application is a divisional of U.S. application Ser. No. 16/353,206 filed Mar. 14, 2019 for "METHOD OF CREATING A COMPONENT VIA TRANSFORMATION OF REPRESENTATIVE VOLUME ELEMENTS" by J. F. Wiedenhoefer.

BACKGROUND

This disclosure relates generally to partitioned component volumes, and more particularly to forming a partitioned heat exchanger core via transformation of representative volume elements (RVEs) from a RVE domain into a component volume domain.

Heat exchanger design often seeks to maximize the transmission of heat flux from one fluid to another or among multiple fluids within the heat exchanger core. To this end, many heat exchanger designs increase the surface area in contact between fluids within the heat exchanger core. Heat exchanger core designs having a relatively high surface area to volume ratio, or heat exchanger density, are referred to as compact heat exchangers. While large surface areas in compact heat exchangers increase heat transfer efficiency, the resulting relatively small fluid passage size is more susceptible to fouling and high pressure losses, which can be undesirable in some applications.

Recent attempts to address these disadvantages include forming heat exchanger cores by replicating representative volume elements (RVE), also known as representative elementary volumes (REV), within the core volume of heat exchangers. A Representative Volume Element (RVE) or Representative Elementary Volume (REV) is the smallest unit volume representation of a more complicated geometry. For periodic structures and materials, the RVE is the smallest unit volume that can be replicated in at least one direction of three-dimensional space to produce the overall structure. RVEs that can be replicated in three orthogonal directions are termed triply periodic structures. Some of these triply periodic RVE structures produce dissimilar boundary faces and require a particular orientation, or crystalline structure, with respect to the adjacent RVEs to form a unitary structure. Other RVEs have identical boundary faces, permitting the RVE to be rotated with respect to the adjacent RVEs while maintaining a unitary structure otherwise known as orientation independent structures.

While RVEs have improved fouling performance and reduced pressure loses in compact heat exchangers, the boundary geometries of some heat exchanger core volumes are not readily discretized by the RVE. Typically, when RVEs are replicated in three dimensions to fill a core of the heat exchanger, boundaries of the heat exchanger core volume intersect some of the RVEs, producing partial RVEs at the heat exchanger core boundaries. Depending on the degree the heat exchanger core volume geometry deviates from the RVE geometry, partial RVEs can result in large unused regions of the heat exchanger core since each partial RVE does not completely partition the unit volume and, hence, does not completely separate fluid volumes of the heat exchanger. Moreover, attempts to body-fit the RVE structure to the target volume distorts the RVE structure and produces curvature discontinuities at the boundaries of each RVE element. These discontinuities are detrimental to fluid flow within the heat exchanger by increasing pressure loss and, in some cases, locally directing fluid in disadvantageous directions and creating regions of high thermal stress.

SUMMARY

In one example, a method of forming a component includes defining a component volume discretized by a target mesh. The target mesh includes a plurality of volume elements, each volume element being defined, at least in part, by a quartic, or higher order, shape function and a plurality of volume nodes. The method further includes defining a parting surface within a representative volume element (RVE). Boundary edges of the parting surface are defined by the intersection of the parting surface and boundary faces of the representative volume element. The method further includes discretizing the parting surface using a surface mesh. The surface mesh includes a plurality of surface elements defined by a plurality of surface nodes. Among the surface nodes are boundary surface nodes located along one of the boundary edges of the parting surface. The method further includes mapping the surface mesh into each volume element of the target mesh according to the shape function of each volume element to produce a component surface structure, and forming a component based on the component surface structure.

In another example, a component includes a plurality of modified representative volume elements positioned within a volume defined by the component and a plurality of dividing structures, each dividing structure defined within one of the modified representative volume elements. The boundary faces of each modified representative volume element are altered with respect to boundary faces of a base representative volume element to conform the modified representative volume element to the volume of the component. The dividing structure has a curvature that is continuous with adjacent dividing structures of adjacent modified representative volume elements.

DETAILED DESCRIPTION

Figure 1A:
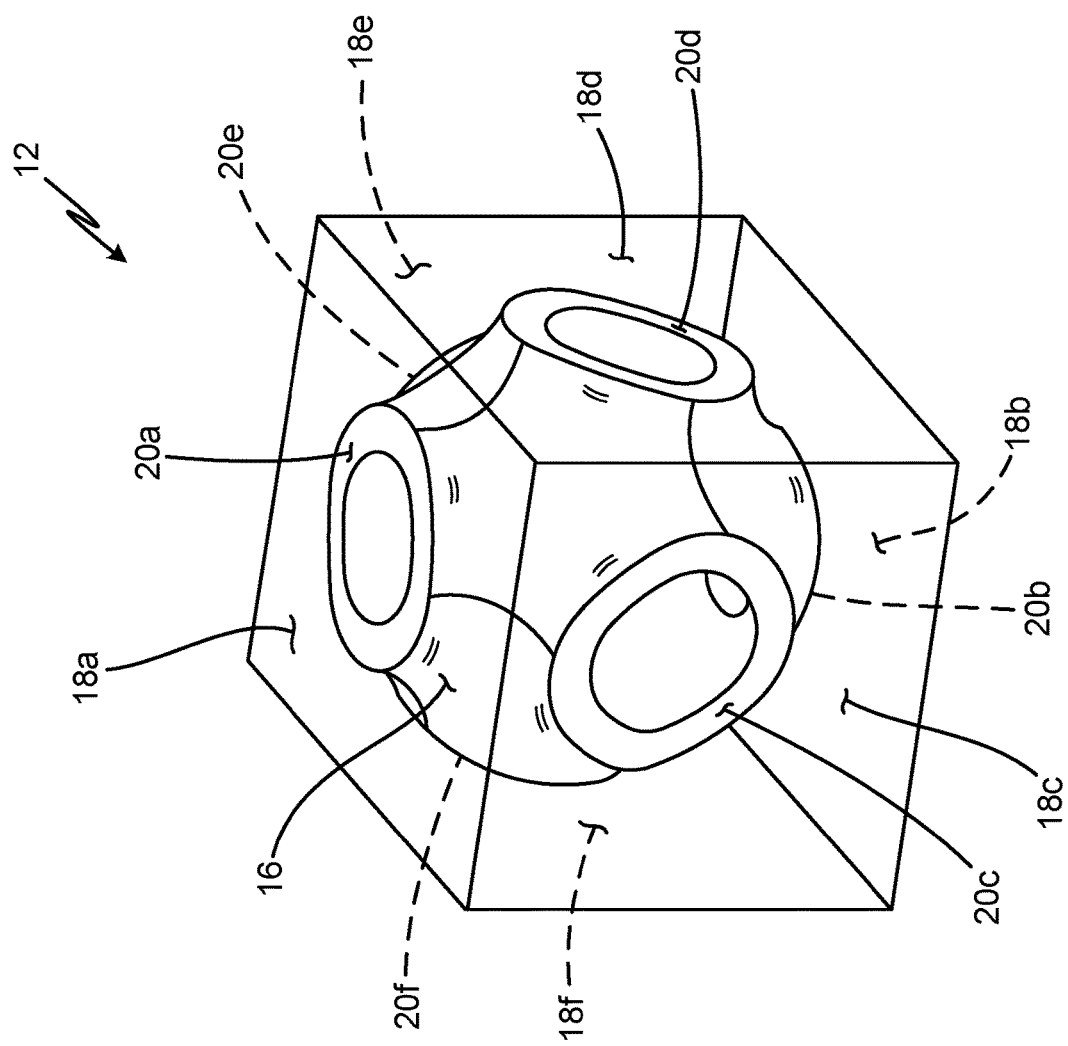
FIGS. 1A-1D and 2A-2E are isometric views of exemplary representative volume elements (RVE).
Figure 1C:
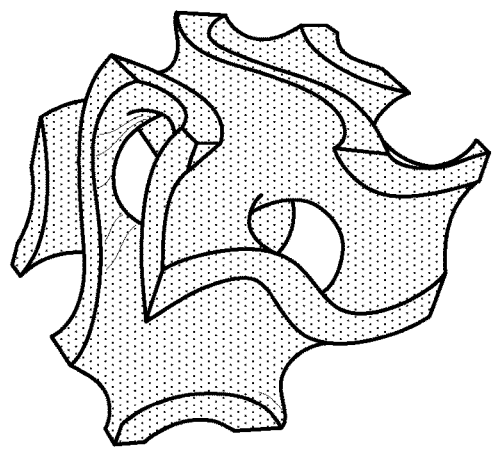
Figure 1D:
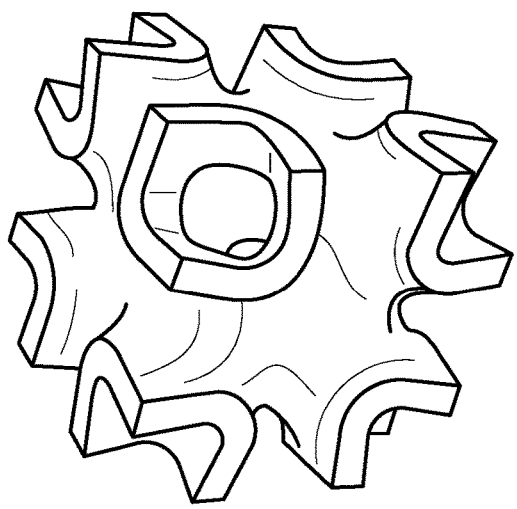
Figure 1B:
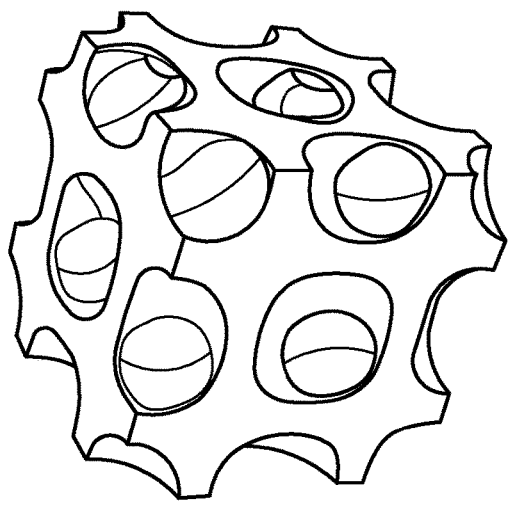

As disclosed herein is a method for mapping an RVE structure to a target volume that produces a net RVE structure having surfaces of continuous curvature between adjacent RVE structures and eliminates partial RVEs at the target volume boundaries. The method includes selecting one of any number of RVE structures and creating a surface mesh that discretizes the RVE structure in a unit volume. The resulting RVE surface mesh is parametrized and stored for later use. Further, the method includes generating a target volume, which can be easily discretized by the RVE structure or, alternatively, not readily discretized by the RVE structure due to dissimilarities between the RVE structure shape and the target volume shape. Subsequently, the method discretizes the target volume using a coarse mesh relative to the RVE surface mesh that is enhanced and smoothed to develop shape functions of at least a fourth order for each target mesh element. Using the enhanced mesh, the RVE surface mesh can be mapped to each element of the target volume based on node and control point locations as well as shape functions of the enhanced target mesh. Due to the shape functions, the resulting mapped and replicated RVE surface mesh is normal to the element boundaries of the target mesh. Thereafter, the RVE surface structure is inflated based on a field function to a desired thickness profile, for example, a constant thickness profile. The resulting structure fills a target volume with replicated RVE structures that maintain continuous surface curvature with no partial RVE structures at the target volume boundaries.

While the exemplary embodiment of the following method describes mapping an RVE to a heat exchanger core, the method is equally applicable to other structures which can be described by a replicated RVE. For instance, structural components such as airfoils and composite members and other fluid conveying members, such as pipes and the like, can be produced in accordance with the following disclosure. As applied to heat exchanger cores, the RVE structure is defined by a dividing surface. Dividing surfaces can take any shape that produces the desired periodic characteristics and that partition the RVE unit volume into two or more discrete volumes.

In certain embodiments, the dividing surface can be based on a minimal surface, or a surface with a minimized local area. In other words, a minimal surface is a surface that has the smallest possible surface area for a given boundary. Additionally, minimal surfaces have a zero mean curvature, i.e., the sum of the principle curvatures at each point is zero. One subset of RVEs are Triply Periodic Minimal Surfaces (TPMS) that are RVEs in which the dividing surface is a minimal surface that produces a triply periodic unit structure. Examples of TPMS structures include the Schwarz-P, Schwarz-D, Schoen-G, and IWP structures (depicted by FIGS. 1A, 1B, 1C, and 1D, respectively) known in the art, each structure being based on a thickened minimal surface that partitions the RVE unit volume into two discrete volumes.

Figure 2B:
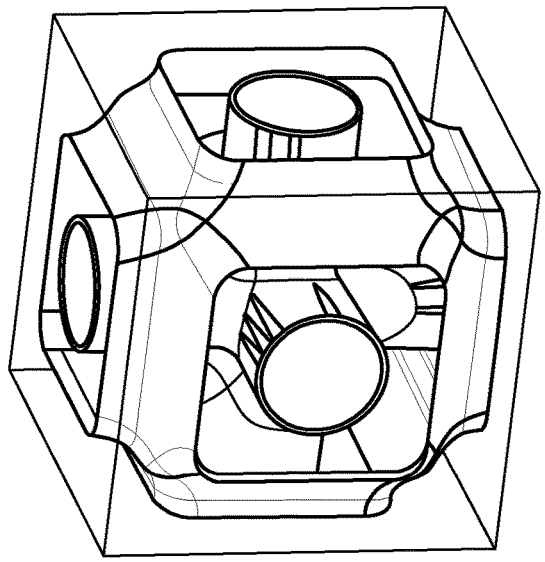
Figure 2C:
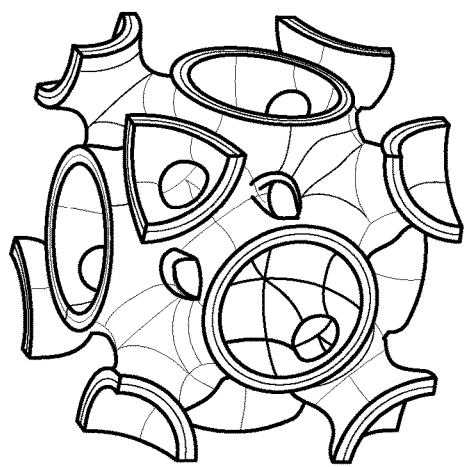
Figure 2A:
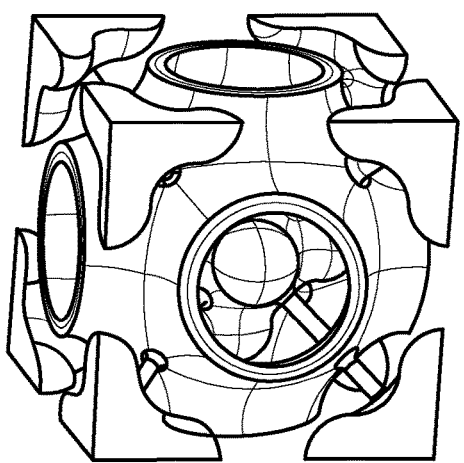
Figure 2E:
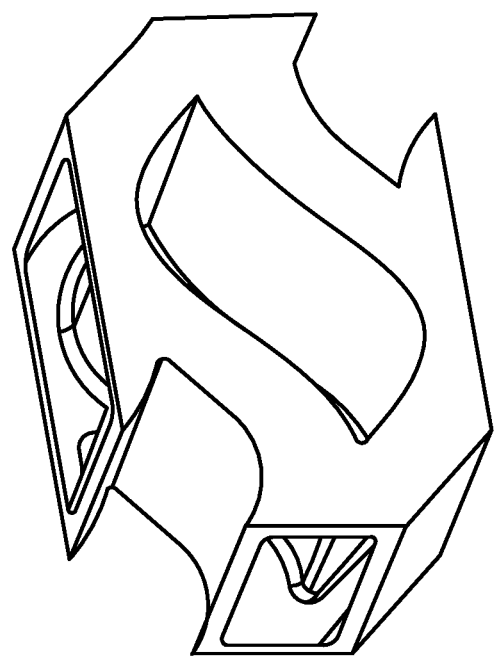
Figure 2D:
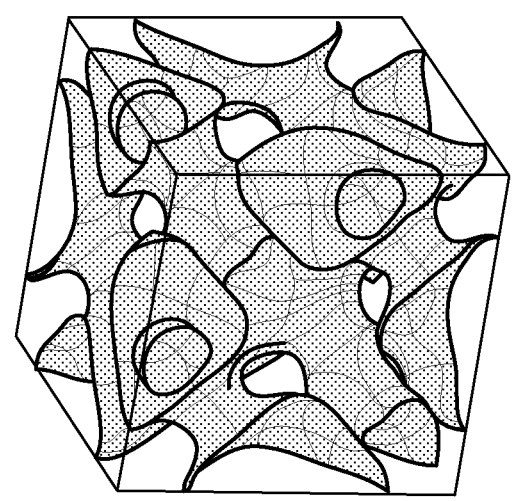

In other RVE embodiments, the dividing surface is not a minimal surface or is based on a minimal surface that has been modified with additional structural features that produce a net surface that is not a minimal surface. For example, FIG. 2A depicts a modified Schwarz-P surface that includes an obstruction volume positioned at the geometric center of the unit volume, each obstruction volume connected by diagonally-extending cylindrical volumes. In another example, FIG. 2B depicts a structure partitioning the unit volume into three discrete volumes by a rectangular surface resembling a Schwarz-P surface combined with an center volume formed by three intersecting cylindrical volumes. In yet another example, FIG. 2C depicts a Truchet structure having an explicitly defined, non-minimal surface which is triply periodic and orientation independent. In still other examples, a modified Truchet structure is shown in FIG. 2D, and a wavy fin design is shown by FIG. 2E.

All of the foregoing RVEs are based on a cubic or rectangular unit volume. While cubic or rectangular unit volumes are easily replicated along three mutually orthogonal directions in three-dimensional space, many heat exchanger applications do not include heat exchanger cores that are strictly cubic or rectangular such that the cubic unit volume readily conforms to the boundaries of the heat exchanger core without resulting in partial RVEs or cut-cells. Furthermore, RVEs may have other unit volume shapes based on trapezoidal, rectangular, or other polygonal cross-sections projected along a longitudinal direction to create a volume as well as tetrahedral, polyhedral, or other three-dimensional shapes. In either case, when the heat exchanger core volume shape is dissimilar to the RVE unit volume shape, a method in accordance with following disclosure can be applied.

For illustrating purposes only, the disclosed method will be described with respect to RVE 12, shown by the isometric view in FIG. 1A, and target volume 14, shown by the isometric view in FIG. 3. While dividing structure 16 of RVE 12 is based on a Schwarz-P TPMS structure, as depicted by FIG. 1A, RVE 12 can include any dividing surface, whether based on a minimal surface or not, that partitions the unit volume of RVE 12 into two or more discrete volumes. RVE 12 is a cubic unit volume defined by sides 18a, 18b, 18c, 18d, 18e, and 18f. Dividing structure 16 intersects sides 18a-18f to define respective boundary faces 20a, 20b, 20c, 20d, 20e, and 20f.

Figure 3:
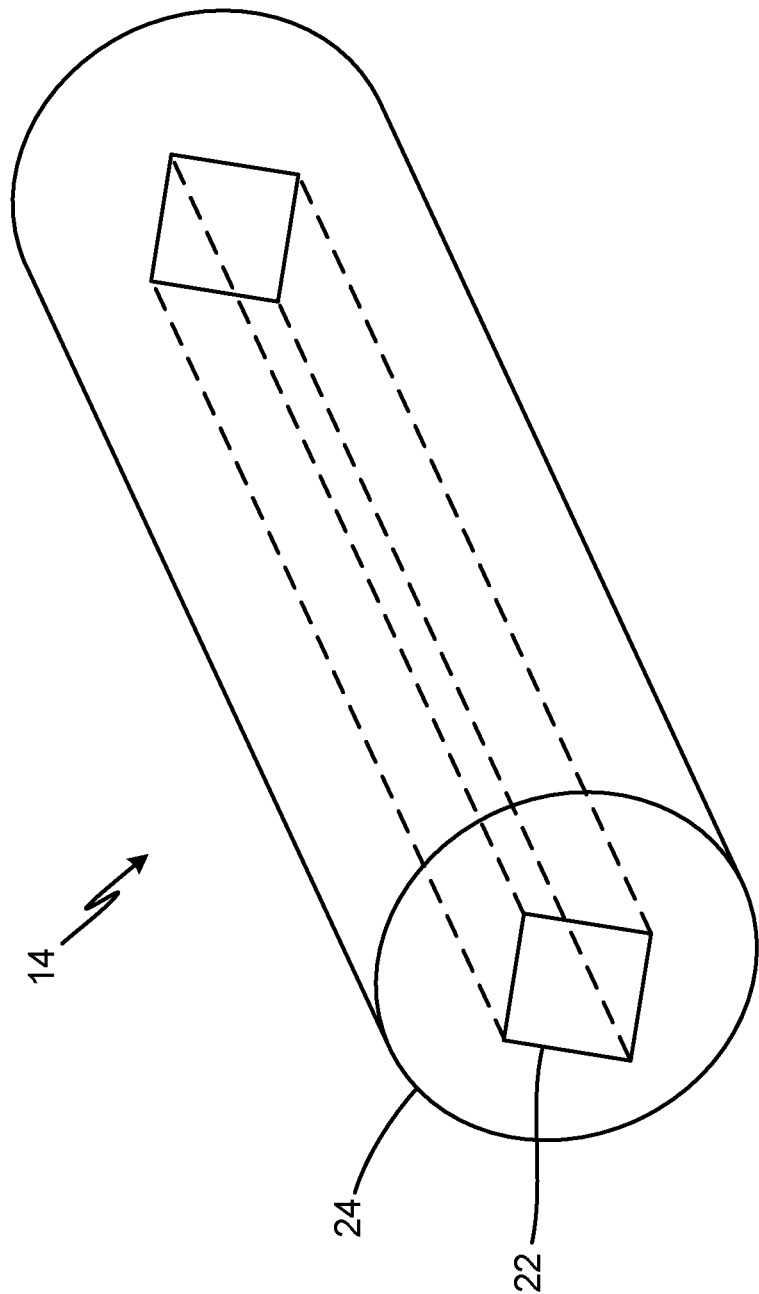
FIG. 3 is an isometric view of an exemplary target volume into which the RVE of FIG. 1A can be mapped and replicated.

Target volume 14 of FIG. 3 is the domain into which the RVE is to be replicated and can take any form required by a particular application. For example, target volume 14 can be a pipe, an annulus, an airfoil shape, or any other abstract volume designed to fit an existing space. As applied to heat exchangers, target volume 14 will be the heat exchanger core volume contained between the inlet and outlet manifolds for each of the fluid streams. Certain portions of the RVE can be closed off at the peripheral boundaries of the heat exchanger core to form two or more discrete regions for fluid to traverse the heat exchanger core.

As depicted in FIG. 3, target volume 14 is a tubular volume in which the cross-section is characterized by square or rectangular center area 22 encircled by annular cross-section 24, each cross-section projected along a longitudinal direction to form a volume. In this exemplary embodiment, target volume 14 is representative of a heat exchanger core through which two fluids are placed in a heat exchanger relationship with each other. However, target volume 14 can be representative of other components for which RVE 12 or another RVE can be mapped and fit.

In this case, RVE 12 is a cubic volume that will be fitted to a tubular target volume 14. The radially outer boundary defined by projected annular cross-section 24 is cylindrical. Because the exemplary RVE 12 has a cubic boundary, the cylindrical boundary of target volume 14 will intersect RVE 12 near the boundaries if RVE 12 is replicated in mutually orthogonal axes of coordinate system 26. If instead, RVE 12 is replicated in a polar pattern about a longitudinal dimension of target volume 14 within annular cross-section 24, RVE elements become distorted such that a side of RVE 12 in the plane of cross-section 24 takes the form of a trapezoid. In other words, the radially outward side of RVE 12, as it is placed within annular cross-section 24, is longer relative to the radially inward side of RVE 12. While this simplistic body-fitting method reduces the number of partial RVEs 12 at the boundaries of target volume 14, the curvature of dividing structure 16 forms discontinuities at the RVE 12 boundaries. These discontinuities are detrimental for use in heat exchanger cores because the curvature discontinuities form small protrusions or an incongruent surface that disrupt the fluid flow lines within the heat exchanger core and produce high thermal stresses.

Figure 4:
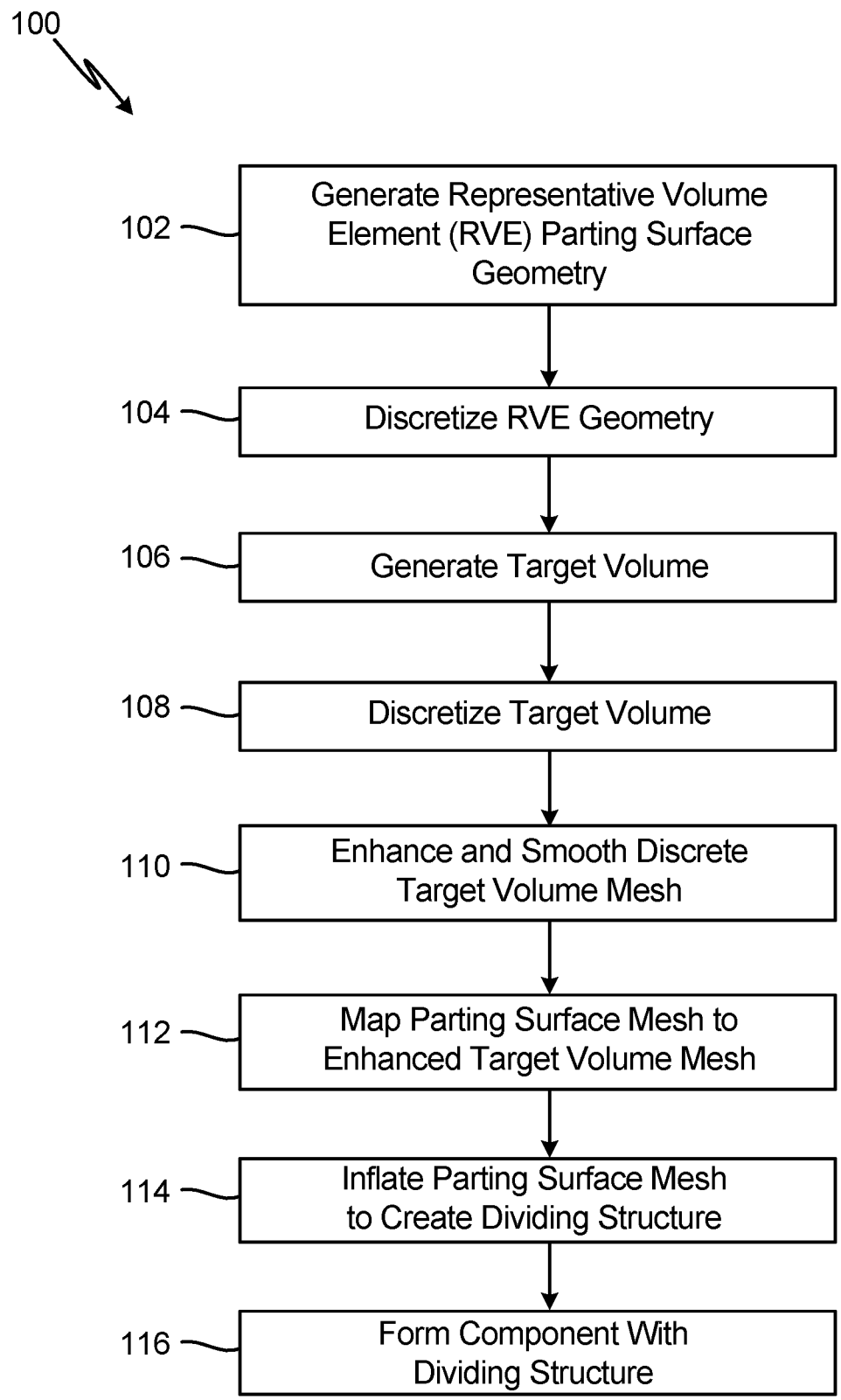
FIG. 4 is a flow chart describing steps of a method of forming a component having a RVE replicated into a target volume.

FIG. 4 is a flow chart describing method 100 in accordance with the present disclosure that fits dissimilar RVE unit and target volumes without these curvature discontinuities and while eliminating partial RVEs at the target volume boundaries.

At the outset, the geometry of RVE 12 will be generated in step 102 by defining a parting surface representative of dividing structure 16. The parting surface is a zero-thickness surface that, in some embodiments, partitions the RVE into two or more discrete volumes. Following subsequent steps described below, the parting surface will be inflated, or thickened, by offsetting respective points on parting surface in opposing directions normal to the parting surface according to a field function to define dividing structure 16 having a user-defined thickness profile.

In some embodiments, the parting surface can be represented by a mathematical definition for geometries that have an implicit mathematical form. Mathematical definitions of parting surfaces include creating a zero-distance level function centered on the geometric center of RVE 12 marked by an origin having XYZ coordinates (0, 0, 0) and having bounds of +/−π The Schwarz-P, Schwarz-D, Schoen-G, and IWP TPMS structures are readily defined by mathematical equations, each being defined by equations 1, 2, 3, and 4, respectively, as is known in the art.

Schwarz-P $\cos(x)+\cos(y)+\cos(z)=0$ (Equation 1)

Schwarz-D $\cos(x)\cos(y)\cos(z)-\sin(x)\sin(y)\sin(z)=0$ (Equation 2)

Schoen-G $\cos(x)\sin(y)+\cos(y)\sin(z)+\cos(z)\sin(x)=0$ (Equation 3)

IWP $2\cos(x)\cos(y)+2\cos(x)\cos(z)+2\cos(y)\cos(z)-\cos(2x)-\cos(2y)-\cos(2z)=0$ (Equation 4)

In other embodiments, the parting surface of RVE 12 can be defined explicitly by using computer-based tools such as computer-aided design or (CAD) programs. For example, the explicit definition of the parting surface can be developed by, first, dividing the unit volume of RVE 12 into octants relative to the origin located at the geometric center of RVE 12. In one of the octants of RVE 12, a portion of parting surface is defined having any suitable shape. Subsequently, a parting surface spanning the entire RVE is created by mirroring the octant portion of the parting surface with respect to mutually orthogonal X, Y, and Z axes. Accordingly, the resulting RVE parting surface is triply periodic as well as orientation independent because the parting surface is identical at the RVE boundaries. Furthermore, parting surfaces that are normal to sides 18a-18f of RVE 12 can produce dividing structures 16 having surfaces that are devoid of discontinuities at the RVE 12 boundaries.

Figure 5:
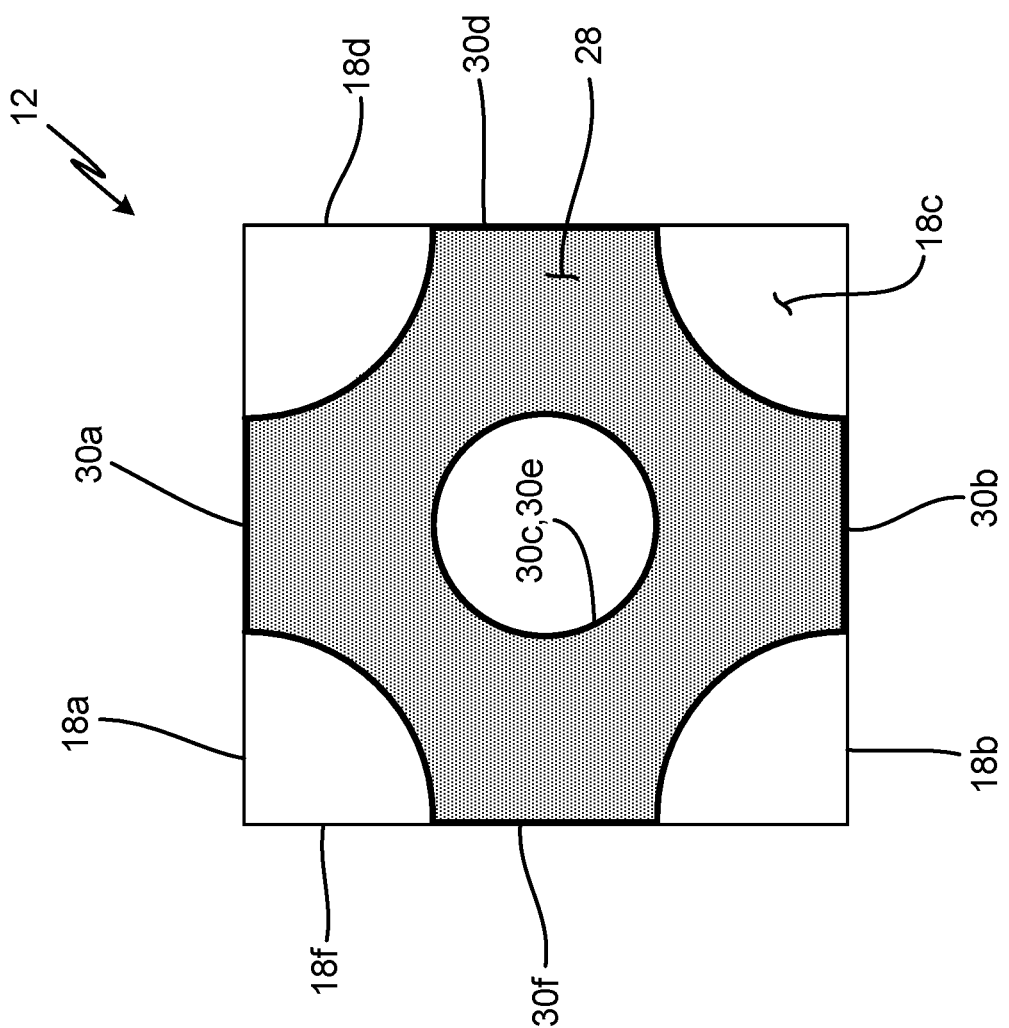
FIG. 5 is a side view of the exemplary RVE showing a parting surface from which the RVE structure is defined.

FIG. 5 is an elevation view showing side 18c of RVE 12 and exemplary parting surface 28 resulting from step 102 of method 100. Parting surface 28 is representative of dividing structure 16 depicted by FIG. 1A. The intersection of sides 18a-18f and parting surface 28 define respective boundary edges 30a, 30b, 30c, 30d, 30e, and 30f.

After defining parting surface 28 of RVE 12, parting surface 28 is discretized in step 104 by dividing parting surface 28 into elements having associated nodes at the boundaries of each element. For instance, parting surface 28 can be meshed using a commercially available mesh generating package such as those used for finite element analysis (FEA) and computational fluid dynamics (CFD) packages. For the Schwarz-P geometry shown by FIGS. 1A and 5, a triangular surface mesh can be used to discretize the surface. However, in other embodiments in which the RVE has a different shape, other suitable surface meshes (e.g., a quad mesh) may be used.

Periodic RVEs require the surface mesh to have identically sized elements at boundary edges 30a-30f such that node locations of each boundary element are identically positioned along respective boundary edges 30a-30f. For orientation independent RVEs such as the Schwarz-P or the Truchet structure), the surface mesh may discretize an octant portion of the parting surface, which is subsequently mirrored about orthogonal X, Y, Z axes of the RVE and merged to eliminate duplicate, coincident nodes at the octant boundaries. The resulting surface meshes of parting surface 28 for these RVEs are orientation independent and translationally periodic.

Figure 6:
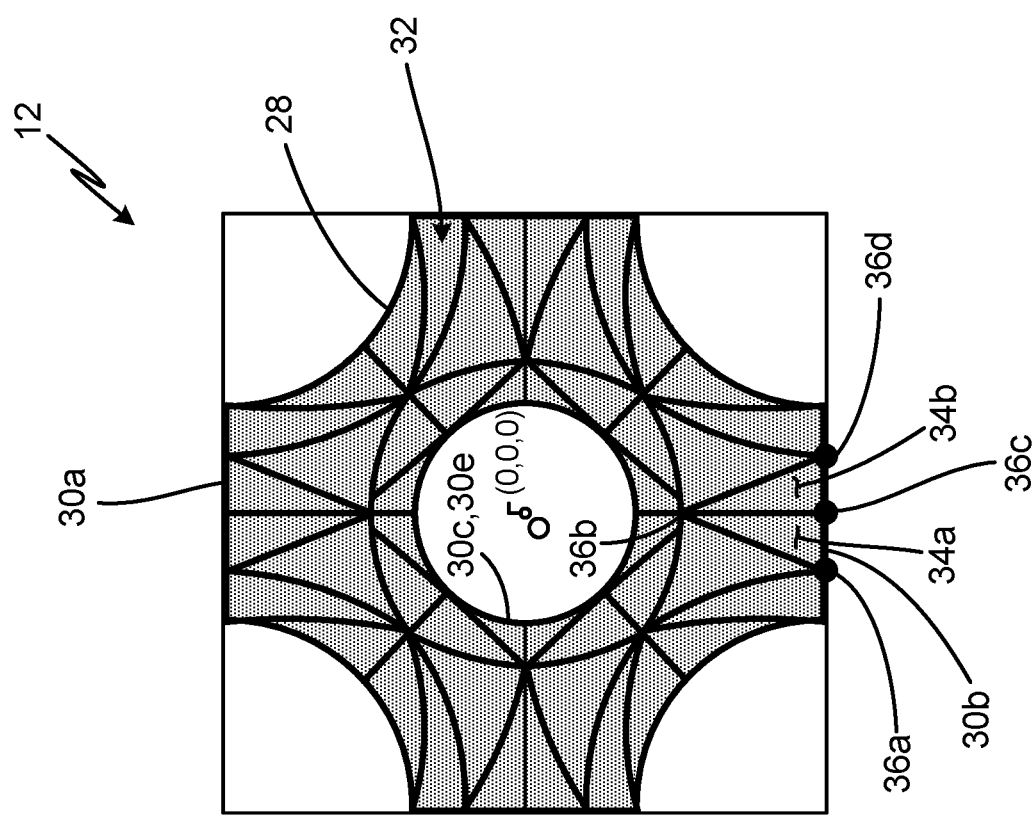
FIG. 6 is a side view of the exemplary RVE showing a discretized parting surface.

FIG. 6 depicts surface mesh 32 of parting surface 28 as viewed from side 18c of RVE 12. As shown, surface mesh 32 includes a plurality of triangular elements. Each triangular element of surface mesh 32 is defined by a node located at respective vertices of the mesh elements. Two elements of the plurality of triangular elements located at boundary edge 30b of parting surface 28 are annotated at 34a and 34b. Element 34a is defined by nodes 36a, 36b, and 36c, and adjacent element 34b is defined by nodes 36b, 36c, and 36d as shown. All of the nodes of surface mesh 32, including nodes 36a-36d, are defined by XYZ nodal coordinates defining a position in three-dimensional space with respect to origin O having XYZ coordinates of (0,0,0) and located at the geometric center of RVE 12.

In preparation for subsequent mapping of parting surface mesh 32 to a target volume mesh, the XYZ nodal coordinates of parting surface mesh 32 are parametrized. Parametrizing XYZ nodal coordinates of parting surface mesh 32 includes normalizing XYZ nodal coordinates to a cube such that each of the XYZ nodal coordinates are greater than or equal to −1 and less than or equal to +1. The resulting normalized coordinates are parametric nodal coordinates $\xi$, $\eta$, $\varsigma$, which are stored for later use in any user defined, or common mesh format (e.g., CFD General Notation System or CGNS).

In step 106 of method 100, the target volume is generated. As described above, target volume can have any shape, but to illustrate the principles of method 100, target volume 14 is a cylindrical volume. Subsequently, the target volume is discretized in step 108 of method 100. As with the discretization of parting surface 28, discretization of target volume 14 includes dividing target volume 14 into elements having associated nodes at the boundaries of each element. The element type applied to target volume 14 has a compatible shape with a shape of the RVE. For embodiments having cubic or rectangular RVEs, target volume 14 is discretized using linear, 8-noded hexahedral elements (i.e., hex elements). In other embodiments, tetrahedral elements, wedge elements, or another element type can be used to discretize target volume 14 if the RVE has a corresponding shape. In still other embodiments, a mixture of element types can be used so long as RVEs having corresponding shapes can be applied to each type of target volume element. Applying an element type to target volume having a shape corresponding to the shape of the RVE allows faces of each RVE to be mapped to corresponding faces of the target volume elements.

Further, the target volume can be discretized using a structured or unstructured mesh. Structured meshes are composed of elements having a defined orientation with respect to the adjacent elements, or crystalline structure, arranged in a regularly-spaced grid pattern. Using a structured mesh, RVEs can be periodic only or can be periodic and orientation independent. Contrastingly, unstructured meshes are characterized by irregular element orientations. For unstructured meshes, RVEs must be orientation independent to facilitate mapping to the target volume.

Figure 7:
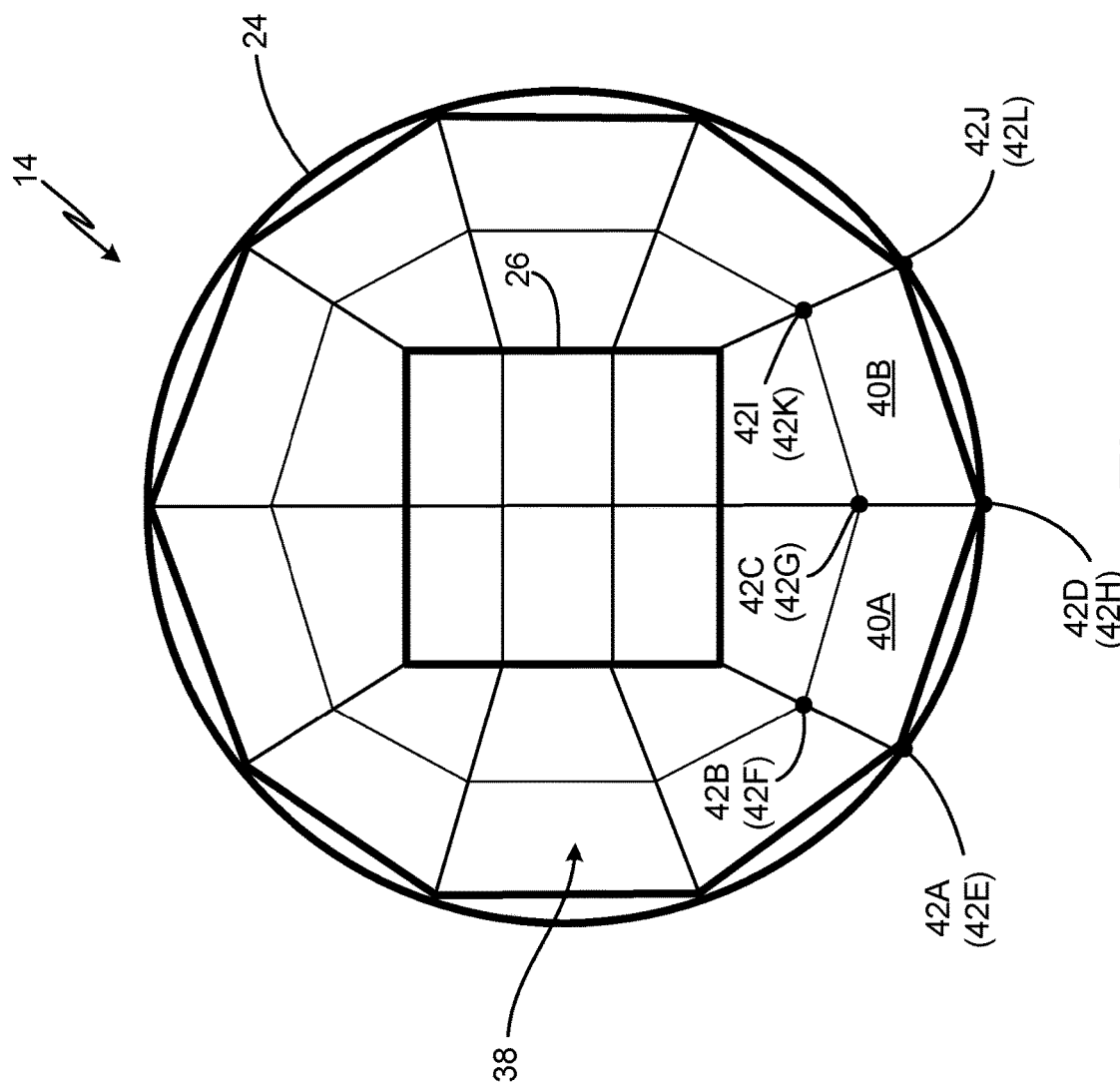
FIG. 7 is an end view of the exemplary target volume that is discretized according to a target mesh.

FIG. 7 depicts an end view of target volume 14 showing exemplary target mesh 38. Target mesh 38 includes a plurality of 8-node hex elements, each element having a cube or cube-like shape. Each element of target mesh 38 is defined by eight nodes located at respective corners of the element. As depicted in FIG. 7, two elements of target mesh 38 are annotated at 40A and 40B and are located adjacent the outer periphery of target volume 14 defined by annular cross-section 24. Element 40A is defined by nodes 42A, 42B, 42C, and 42D shown in FIG. 7 as well as nodes 42E, 42F, 42G, and 42H (shown in parenthetical notation). Similarly, element 40B is defined by nodes 42C, 42D, 42I, and 42J shown in FIG. 7 and nodes 42G, 42H, 42K, and 42L (shown in parenthetical notation). Nodes 42E, 42F, 42G, 42H, 42K, and 42L are offset along the longitudinal dimension of target volume 14 with respect to respective nodes 42A, 42B, 42C, 42D, 42I, and 42J.

As shown in FIG. 7, element edges and faces of target mesh 38 positioned at a peripheral surface of target volume 14 do not conform to the boundary of target volume 14 resulting in so called discretization error. Discretization error occurs with every mesh to some degree when element shapes necessarily approximate and boundary of target volume 14. As depicted in FIG. 7, target mesh 38 is shown with fewer elements than a typical mesh to illustrate the discretization error.

Figure 8:
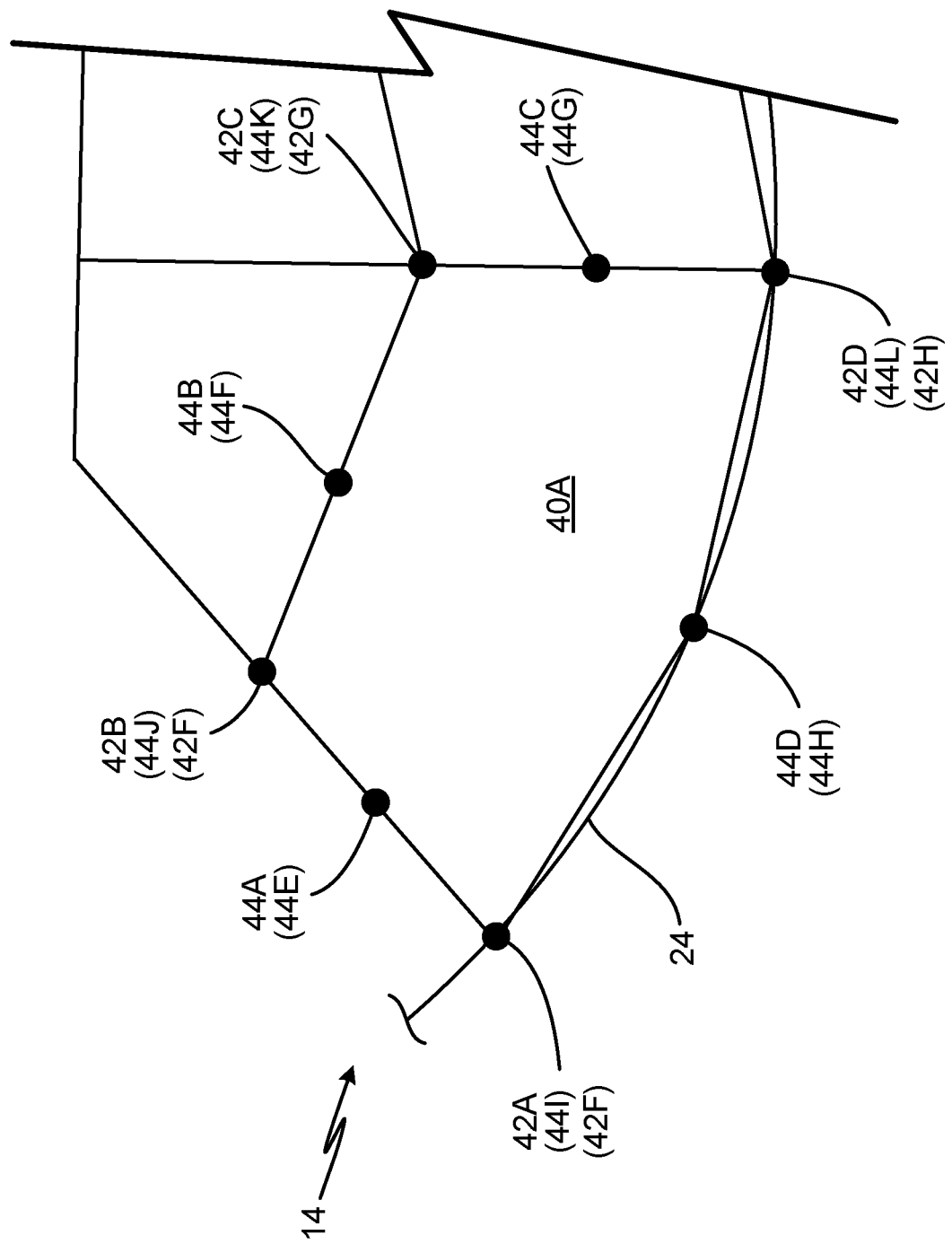
FIG. 8 is a partial end view of the exemplary target volume showing a second order element of the target mesh.

One method to reduce discretization error includes using second order elements (i.e., a serendipity element), which have an additional node along each element edge. For instance, if element 40A was a second order element, element 40A would be defined by nodes 42A-42H located at the corners of element 40A as well as mid-edge nodes 44A-44L, each of mid-edge nodes 44A-44L located along one of twelve edges of element 40A and between two adjacent corner nodes 42A-42H. For instance, as shown in FIG. 8, mid-edge node 44A can be located along an element edge between corner nodes 42A and 42B, and mid-edge node 44B can be located along another element edge between corner nodes 42B and 42C. Similarly, the remaining mid-edge nodes 44C-44L can be located along other edges of element 40A between two adjacent corner nodes 42A-42H as indicated by parenthetical notation in FIG. 8. Using second order elements, the edges of element 40A are able to more closely conform to the peripheral boundary of target volume 14 and annular cross-section 24.

When target mesh 38 is generated using a commercial mesh generator found in commercial finite element analysis (FEA) or computational fluid dynamics (CFD) programs, linear, 8-node HEX elements or second-order, 20-node elements are likely to be used. Moreover, since parting surface mesh 32 of RVE 12 defines a complex curved surface in some embodiments, target mesh 38 is intended to have fewer elements (i.e., a coarser mesh) volume relative to parting surface mesh 32. In FEA and CFD packages, discretization error is normally reduced by increasing the number of elements (i.e., increasing the nodal density). However, since the target mesh 38 is sized to facilitate mapping a RVE structure to each element of the target mesh, increasing the target mesh density is not suitable for reducing the discretization error. As such, the discretization error of target mesh 38 must be reduced further than can be accomplished by linear elements or second order elements alone.

Whether linear elements or second order elements are used to generate target mesh 38 of target volume 14, the discretization error associated with target mesh 38 is reduced by enhancing and smoothing the mesh in step 110 of method 100. Target mesh enhancement begins by adding a plurality of control points to each element of target mesh 38 to further discretize the element boundaries as well as space internal to the element. Subsequently, control points positioned along element edges and element faces adjacent to a boundary of target volume 14 are projected from the element edge, or face, to the target volume boundary. The original nodes and control points of target mesh 38 are repositioned along a boundary of target volume 14. At this stage, mapping parting surface mesh 32 to each element of target mesh 38 could be accomplished, but will result in a parting surface with curvature discontinuities at the element boundaries.

To understand this result, a discussion of element shape functions is required. When parting surface mesh 32 is mapped to target mesh 38, some nodes of parting mesh 32 may coincide with a node or a control point of target mesh 38. In this instance, the nodal position of parting surface mesh 32 will be directly transposed to the position of the node or the position of the control point of target mesh 38. More likely, most nodes of parting surface mesh 32 will not directly coincide with a node or a control point location of target mesh 38. In these instances, an element shape function is used to transform the nodal locations of the parting surface mesh 32 into corresponding nodal locations in the target mesh domain.

Shape functions govern an element solution between nodes of the element. When control points are used, the shape function solution must conform to the node locations as well as the control points in a manner similar to fitting a polynomial curve to a set of points. As applied to mapping parting surface mesh 32 to target mesh 38, the shape function governs the transformed nodal locations of parting surface mesh 32 into the target mesh domain. Moreover, to eliminate curvature discontinuities at the element boundaries, the shape function must depend on a sufficient number of intermediate control points such that the shape function enforces curvature continuity at the element boundaries. More specifically, curvature continuity of parting surface mesh 32 will be maintained if the transformed parting mesh is normal to the element boundaries. For this condition, a shape function of at least a fourth order, or quartic shape function, can be imposed on each element, which requires at least three control points positioned between any two adjacent nodes of the element and between any two opposing control points positioned along an element boundary.

Figure 9:
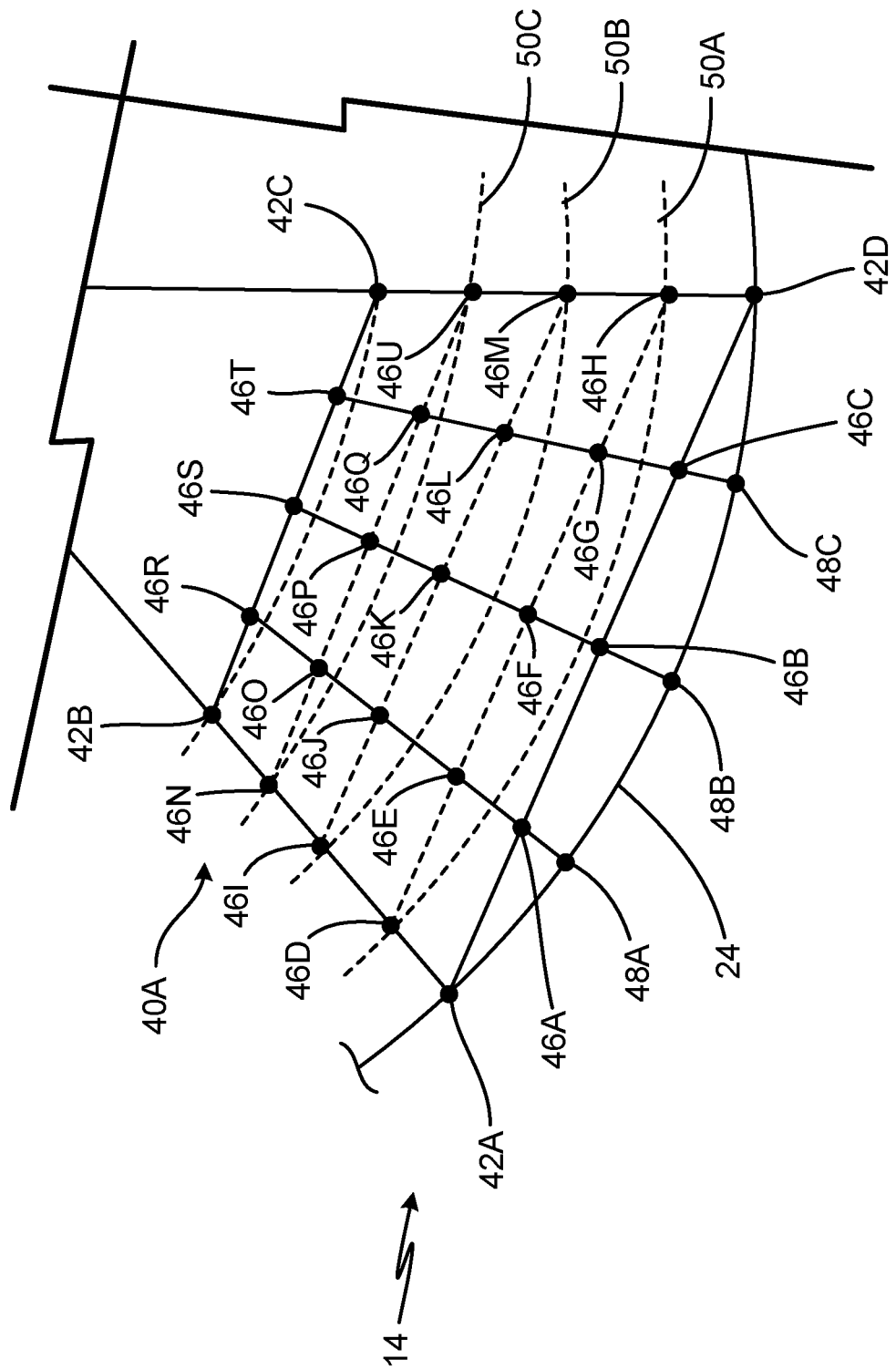
FIG. 9 is a partial end view of the exemplary target volume showing a target mesh enhanced by higher order shape functions.

For an 8-node hex element of target mesh 38, at least one hundred seventeen control points are added to facilitate a quartic, or higher order, shape function, resulting in at least one hundred twenty five nodes and control points combined and arranged in a 5×5×5 grid. FIG. 9 is a side view of element 40A showing twenty one control points 46A-46T of the one hundred seventeen control points added to element 40A. However, it will be understood that similar patterns of nodes and/or control points are present at different longitudinal positions within element 40A. As shown, control points 46A, 46B, and 46C are positioned along an edge of element 40A that is adjacent to the outer radial periphery of cross-section 24 of target volume 14. Control points positioned along an edge of element 40A are referred to as edge control points. For instance, control points 46D, 46I, and 46N are positioned between nodes 42A and 42B along another edge of element 40A. Similarly, control points 46H, 46M, and 46U are between nodes 42C and 42D, and control points 46R, 46S, and 46T are between nodes 42B and 42C, each set of control points positioned along a different edge of element 40A. The remaining control points, 46E-46G, 46J-46L, and 46O-46Q are distributed within the interior of element 40A between two of the edge control points in a grid pattern as shown by FIG. 9. With the addition of control points 46A-46T, as well as additional control points not shown by FIG. 9, element 40A is enhanced such that it is transformed from an 8-node hex element to a group of sixty four linear elements. As a result, shape functions used to map surface mesh 32 into the domain of each element of target mesh 38 depend on the nodes and control points describing each element.

Target mesh 38 is further enhanced by projecting control points positioned along an element edge or element face adjacent to a boundary of target volume 14 from the element onto the target volume boundary. As shown in FIG. 9, control points 48A, 48B, and 48C are projected and repositioned onto the peripheral boundary of cross-section 24 of target boundary 14 as indicated by projected node locations 48A, 48B, and 48C.

Projecting control points onto the target volume boundary can be accomplished using any practical means. In some embodiments, control points can be projected along a direction perpendicular to the element edge or normal to the element face. In other embodiments, control points are projected along one of the orthogonal directions of the target domain coordinate system (i.e., projected along a direction parallel to the X-axis, the Y-axis, or the Z-axis defined with respect to the target volume). In still other embodiments, control points are projected along a direction parallel to vector passing through a set of control points within the element.

As illustrated in FIG. 9, control point 46A is projected along a vector passing through control points 46A, 46E, 46J, 46O, and 46R. Similarly, control point 46B is projected along a vector passing through control points 46B, 46F, 46K, 46P, and 46S, and control point 46C is projected along a vector passing through control points 46C, 46G, 46L, 46Q, and 46T. Projecting control points 46A, 46B, and 46C along respective vector directions relocates control points 46A-46C to projected control point locations 48A, 48B, and 48C, respectively. Other control points positioned along an edge or face of element 40A can be projected onto the boundary of target volume 14 using as similar procedure.

Following element refinement, the node and control point positions are smoothed using a mesh smoothing algorithm, such as a Lagrangian or Laplacian smoother. The smoothing algorithm modifies the initial positions of control points 46A-46T to provide a regular spacing of control points within element 40A while maintaining imposed boundary conditions at the element edges and faces. As applied to enhanced target mesh 38 depicted in FIG. 9, control point locations may be repositioned along control lines 50A, 50B, and 50C, which have been extended beyond the bounds of element 40A for clarity. As shown, each of control lines 50A-50C is perpendicular to edges of element 40A. Similar modifications can be made to the remaining control points within the volumetric bounds of element 40A, repositioning interior control points such that respective control lines are normal to faces of element 40A.

Appling the enhancing and smoothing process to every element of target mesh 38 produces a quartic mesh suitable for mapping parting surface mesh 32 into each element of target mesh 38. In step 112 of method 100, parting mesh 32 of RVE 12 is copied into each element of enhanced target mesh 38 by transforming parametric nodal coordinates ($\xi, \eta, \varsigma$) into XYX coordinates of each element of enhanced target mesh 38 according to governing nodes, control points, and shape functions. This transformation is given by equation 5 below.

$$XYZ_{Final} = \phi(\xi, \eta, \varsigma) \cdot XYZ_{cntr} \quad \text{(Equation 5)}$$

where:
$XYZ_{Final}$ are the transformed nodal coordinates of the parting surface;
$\phi$ is a shape function defining the enhanced target mesh; and
$XYZ_{cntr}$, are the control point coordinates of the target mesh Once parting mesh 32 is mapped onto each element of enhanced target mesh 38, parting mesh 32 is inflated to produce a dividing structure 16 in step 114 of method 100. The inflated surface mesh produces dividing structure 16, which is based on a shape of parting mesh 32. The process of inflating parting mesh 32 includes using a user-defined field function to offset final XYZ nodal coordinates of parting mesh 32 in opposing directions, each direction normal the parting surface. The offset nodal locations are used to transform the surface mesh of the parting surface into three-dimensional elements. If parting surface mesh 32 is composed of triangular surface elements, the resulting mesh is a 6-node wedge element. In other embodiments parting mesh 32 may be composed of quad elements, which become 8-node hex elements post inflation.

The field function can be used to define dividing structure thickness as a function of position along parting surface 28. In some embodiments, a constant field function can be used to generate a uniform or constant thickness profile for dividing structure 16. In other embodiments, the thickness of dividing structure can vary according to user-defined requirements. Taken together, the transformed RVE 12 elements fill target volume 14, the resulting RVE structure reducing or eliminating partial RVEs at the target volume boundaries and having surfaces of continuous curvature at the RVE boundaries.

Subsequently, a component can be formed including dividing surface 16 in step 116 of method 100. Dividing surface 16 takes a form that is based on a shape of parting surface 28 as represented by surface mesh 32. Accordingly, the component includes an assembly of RVEs, sides 18a-18f of each RVE being modified by method 100 to conform to a shape of target volume 14. Similarly, each dividing surface 16, as replicated within each RVE, is modified to conform to the transformed boundaries of respective RVEs.

Replicated and inflated surface mesh 32 defines dividing structures 16, and can be stored using any user defined, or common mesh format (e.g., CFD General Notation System or CGNS) for subsequent manufacturing. Components having relatively simple forms of dividing surfaces 16 can be manufacturing using standard machining processes such as drilling, milling, turning, and combinations of these and like processes. Components with more complicated forms of dividing surfaces 16, such as those formed by replicated RVEs depicted by FIGS. 1A-1E and 2A-2D, can be formed by additive manufacturing processes using selective laser sintering (DLS), direct metal laser sintering (DMLS), and selective laser melting (SLM) techniques, among other additive manufacturing techniques.

The foregoing steps of method 100 are presented in sequence for illustrative purposes only and are not meant to limit method 100 in any way. Accordingly, it will be understood that portions of method 100 can proceed in a different logical order, additional or intervening portions can be included, or described portions of method 100 can be omitted without detracting from the described above.

Discussion of Possible Embodiments

The following are non-exclusive descriptions of possible embodiments of the present invention.

A method of forming a component according to an exemplary embodiment of this disclosure, among other possible things, includes defining a component volume discretized by a target mesh. The target mesh includes a plurality of volume elements, each volume element being defined, at least in part, by a shape function and a plurality of volume nodes. The method further includes defining a parting surface within a representative volume element. Boundary edges of the parting surface are defined by the intersection of the parting surface and boundary faces of the representative volume element. The method further includes discretizing the parting surface using a surface mesh. The surface mesh includes a plurality of surface elements defined by a plurality of surface nodes. Among the surface nodes are boundary surface nodes located along one of the boundary edges of the parting surface. The method further includes mapping the surface mesh into each volume element of the target mesh according to the shape function of the target mesh to produce a component surface structure, and forming a component based on the component surface structure.

The method of the preceding paragraph can optionally include, additionally and/or alternatively, any one or more of the following features, configurations and/or additional components:

A further embodiment of the foregoing method, wherein the shape function can be a quartic or higher order shape function.

A further embodiment of any of the foregoing methods, wherein the component volume can have a shape that is dissimilar to a shape of the representative volume element.

A further embodiment of any of the foregoing methods, wherein defining the parting surface within the representative volume element can include partitioning the representative volume element into two or more discrete volumes using the parting surface.

A further embodiment of any of the foregoing methods, wherein defining the parting surface within the representative volume element can include partitioning the representative volume element into at least three discrete volumes using the parting surface.

A further embodiment of any of the foregoing methods can further include enclosing portions of each representative volume element at the boundaries of the component to form two or more discrete volumes of a heat exchanger core, each discrete volume having an input and an output that is discrete from the other discrete volumes.

A further embodiment of any of the foregoing methods can further include inflating the surface mesh based on a field function to produce the component structure after mapping the surface mesh to the target mesh.

A further embodiment of any of the foregoing methods wherein the component has a thickness profile based on the field function.

A further embodiment of any of the foregoing methods wherein the field function defines a uniform thickness profile of the component structure.

A further embodiment of any of the foregoing methods, wherein defining the parting surface within the representative volume element can include locating the boundary surface nodes at identical relative positions along respective boundary edges.

A further embodiment of any of the foregoing methods, wherein the boundary edges formed on each boundary face of the representative volume element can be identical.

A further embodiment of any of the foregoing methods, wherein defining the parting surface within the representative volume element can include forming a first boundary edge on a first boundary face of the representative volume element that is identical to a second boundary edge on a second boundary face of the representative volume element that is opposite the first boundary face.

A further embodiment of any of the foregoing methods, wherein defining the parting surface within the representative volume element can include forming a third boundary edge on a third boundary face of the representative volume that is identical to a fourth boundary edge on a fourth boundary face of the representative volume element that is opposite the third boundary face.

A further embodiment of any of the foregoing methods, wherein the third boundary face and the fourth boundary face can join the first boundary face to the second boundary face.

A further embodiment of any of the foregoing methods, wherein defining the parting surface within the representative volume element can include forming a fifth boundary edge on a fifth boundary face of the representative volume that is identical to a sixth boundary edge on a sixth boundary face of the representative volume element that is opposite the fifth boundary face.

A further embodiment of any of the foregoing methods, wherein the fifth boundary face and the sixth boundary face can join the first boundary face to the second boundary face.

A further embodiment of any of the foregoing methods, wherein the fifth boundary face and the sixth boundary face can join the third boundary face to the fourth boundary face.

A further embodiment of any of the foregoing methods, wherein the target mesh can have fewer elements per unit of component volume than the surface mesh.

A further embodiment of any of the foregoing methods, wherein defining the component volume can include enhancing the target mesh by applying a plurality of control points to each element of the target mesh.

A further embodiment of any of the foregoing methods, wherein a first portion of the control points can be positioned between adjacent volume nodes of each element of the target mesh.

A further embodiment of any of the foregoing methods, wherein a second portion of the control points can be positioned within each element of the target mesh.

A further embodiment of any of the foregoing methods, wherein defining the component volume includes projecting control points associated with boundary elements of the target mesh adjacent a boundary of the component volume from the boundary elements onto the boundary of the component volume.

A further embodiment of any of the foregoing methods, wherein defining the component volume can include using a smoothing function to minimize spacing variation between adjacent control points.

A further embodiment of any of the foregoing methods, wherein defining the component volume can include defining the shape function such that, after mapping the surface mesh to the target mesh, the surface mesh is normal to the boundaries of each element.

A component in accordance with an exemplary embodiment of this disclosure, among other possible things, includes a plurality of modified representative volume elements positioned within a volume defined by the component and a plurality of dividing structures, each dividing structure defined within one of the modified representative volume elements. Each of the modified representative volume elements is based on a base representative volume element and has boundary faces that are altered with respect to boundary faces of the base representative volume element to conform to the volume of the component.

The component of the preceding paragraph can optionally include, additionally and/or alternatively, any one or more of the following features, configurations and/or additional components:

A further embodiment of the foregoing component, wherein the dividing structures can partition the volume of the component into two or more discrete sub-volumes.

A further embodiment of any of the foregoing components, wherein portions of the modified representative volume elements are enclosed to form two or more discrete volumes of a heat exchanger core, each discrete volume with an input and an output that is discrete from the other discrete volumes.

A further embodiment of any of the foregoing components, wherein the base representative volume can be triply periodic.

A further embodiment of any of the foregoing components, wherein the base representative volume can be orientation independent.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A component comprising:
a plurality of modified representative volume elements positioned within a volume defined by the component, each modified representative volume element based on a base representative volume element, wherein boundary faces of each modified representative volume element are altered with respect to boundary faces of the base representative volume element to conform the modified representative volume elements to the volume of the component; and
a plurality of dividing structures, each dividing structure defined within one of the modified representative volume elements, each dividing structure having a curvature that is continuous with adjacent dividing structures of adjacent modified representative volume elements, wherein the dividing structures partition the volume of the component into two or more discrete sub volumes;
wherein portions of each of the modified representative volume elements are enclosed to form two or more discrete volumes of a heat exchanger core, each discrete volume with an input and an output that is discrete from the other discrete volumes.

2. The component of claim 1, wherein the base representative volume element is triply periodic.

3. The component of claim 1, wherein the base representative volume element is orientation independent.

4. The component of claim 1, wherein the dividing structures partition the volume of the component into at least three discrete sub volumes.

5. The component of claim 1, wherein each dividing structure of the plurality of dividing structures includes a constant thickness profile.

6. The component of claim 1, wherein each dividing structure of the plurality of dividing structures includes a variable thickness profile.

7. The component of claim 1, wherein the base representative volume element and the volume of the component have dissimilar shapes.

8. The component of claim 1, wherein the dividing structure is normal to the boundary faces of the modified representative volume element at respective intersections of the dividing structure and the boundary faces.

9. A component comprising:
a plurality of modified representative volume elements positioned within a volume defined by the component, each modified representative volume element based on a base representative volume element, wherein boundary faces of each modified representative volume element are altered with respect to boundary faces of the base representative volume element to conform the modified representative volume elements to the volume of the component; and
a plurality of dividing structures, each dividing structure defined within one of the modified representative volume elements, each dividing structure having a curvature that is continuous with adjacent dividing structures of adjacent modified representative volume elements, wherein the dividing structures partition the volume of the component into two or more discrete sub volumes, and wherein the dividing structures are normal to the boundary faces of the modified representative volume element at respective intersections of the dividing structures and the boundary faces.

10. The component of claim 9, wherein the base representative volume element is triply periodic.

11. The component of claim 9, wherein the base representative volume element is orientation independent.

12. The component of claim 9, wherein the dividing structures partition the volume of the component into at least three discrete sub volumes.

13. The component of claim 9, wherein each dividing structure of the plurality of dividing structures includes a constant thickness profile.

14. The component of claim 9, wherein each dividing structure of the plurality of dividing structures includes a variable thickness profile.

15. The component of claim 9, wherein the base representative volume element and the volume of the component have dissimilar shapes.

* * * * *